(12) United States Patent
Subramanian et al.

(10) Patent No.: US 11,983,217 B2
(45) Date of Patent: May 14, 2024

(54) RESPONDING TO QUERIES WITH VOICE RECORDINGS

(71) Applicant: GOOGLE LLC, Mountain View, CA (US)

(72) Inventors: Sowmya Subramanian, San Francisco, CA (US); Benton DeLoache, Mountain View, CA (US); Lauren Clark, San Francisco, CA (US); Rami Banna, Menlo Park, CA (US); Igor Benko, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 31 days.

(21) Appl. No.: 17/778,993

(22) PCT Filed: Dec. 13, 2019

(86) PCT No.: PCT/US2019/066221
§ 371 (c)(1),
(2) Date: May 23, 2022

(87) PCT Pub. No.: WO2021/118595
PCT Pub. Date: Jun. 17, 2021

(65) Prior Publication Data
US 2023/0009983 A1  Jan. 12, 2023

(51) Int. Cl.
*G06F 7/00* (2006.01)
*G06F 16/635* (2019.01)
*G10L 15/22* (2006.01)

(52) U.S. Cl.
CPC ............ *G06F 16/635* (2019.01); *G10L 15/22* (2013.01); *G10L 2015/223* (2013.01)

(58) Field of Classification Search
CPC .. G06F 16/635; G10L 15/22; G10L 2015/223
(Continued)

(56) References Cited

U.S. PATENT DOCUMENTS 9,280,610 B2  3/2016  Gruber et al.
10,296,959 B1  5/2019  Chernikhova et al.
(Continued)

FOREIGN PATENT DOCUMENTS

WO  2021118595  6/2021

OTHER PUBLICATIONS

Nichols, D. et al.; "Recommendation and Usage in the Digital Library;" CSEG, Computing Department, Lancaster University; http://www.comp.lancs.ac.uk/computing/research/cseg/97_rep.html; 15 pages; Dated 1997.
(Continued)

*Primary Examiner* — Isaac M Woo
(74) *Attorney, Agent, or Firm* — Gray Ice Higdon

(57) ABSTRACT

Implementations are provided for providing responsive audio recordings to user queries that are prerecorded by human beings, rather than generated automatically using speech synthesis processing. In various implementations, a query provided by a user at an input component of a computing device may be used to search a corpus of voice recordings From the searching, a plurality of candidate responsive voice recordings may be identified and ranked based on measures of credibility associated with speakers that created the candidate responsive voice recordings. Based on the ranking, one or more of the plurality of candidate responsive voice recordings may be provided for presentation to the user at an output component of the same computing device or a different computing device.

12 Claims, 5 Drawing Sheets

(58) Field of Classification Search
USPC .................................................. 707/600–899
See application file for complete search history.

(56) References Cited

U.S. PATENT DOCUMENTS

| | | |
|---|---|---|
| 2013/0304758 A1 | 11/2013 | Gruber et al. |
| 2015/0279366 A1 | 10/2015 | Krestnikov et al. |
| 2016/0171100 A1* | 6/2016 | Fujita .................... G10L 15/10 707/722 |

OTHER PUBLICATIONS

European Patent Office; International Search Report and Written Opinion of PCT Ser. No. PCT/US2019/066221; 10 pages; dated Aug. 19, 2020.
Sarah Perez, "Amazon's crowdsourced Q&A community Alexa Answers goes live for all" TechCrunch+. Retrieved from https://techcrunch.com/2019/09/12/amazons-crowdsourced-qa-community-alexa-answers-goes-live-for-all/. 11 pages. Dated Sep. 12, 2019.

* cited by examiner

RESPONDING TO QUERIES WITH VOICE RECORDINGS

BACKGROUND

Individuals (or "users") are increasingly interacting with computing devices using their voices. For example, users are increasingly relying on interactive assistant software (alternatively referred to as "automated assistants," "virtual assistants") to answer the users' questions using audible output, alone or in combination with other output modalities. Text-to-speech ("TTS") and/or voice synthesis processing can be applied to generate audible output based on textual results that are responsive to a user's question, so that a user asking a question using his or her voice can receive an audible response. However, the computerized-voice response generated by the TTS processing may not be as compelling and/or credible to the user than, for instance, a voice recording of a known expert, or at least a human being, that is responsive to the question.

SUMMARY

The present disclosure is generally directed to methods, apparatus, and computer-readable media (transitory and non-transitory) for providing responsive audio recordings to user queries that are prerecorded by human beings, rather than generated automatically using TTS processing on responsive textual data. In various implementations, a plurality of audio recordings may be stored as a corpus of audio recordings in one or more databases, e.g., in association with various data that is used to index and/or render searchable the audio recordings. This data may include transcriptions of the audio recordings, synopses of the audio recordings, information about speakers that recorded the audio recordings, other metadata associated with the audio recordings (e.g., date created, length, sound quality, etc.), and so forth.

In various implementations, a user may submit a query at an input component of a computing device such as an "assistant" device that is designed to allow users to conduct "hands-free" interaction with an automated assistant. These assistant computing devices may take various forms, such as standalone interactive speakers (with or without displays), vehicle-based computing systems, smart phones, tablet computers, and so forth. The query may be used to search the aforementioned corpus of voice recordings and identify one or more candidate responsive voice recordings. Various aspects of the voice recordings and/or associated data may be searched, including but not limited to transcripts, the questions that were asked to yield the voice recordings (e.g., a question asked of the speaker in an interview in the same recording, or a crowdsourced question to which the speaker deliberately created a voice recording to answer), the identity of the speakers, and so forth.

In some implementations, a plurality of candidate responsive voice recordings may be identified and ranked to determine which should be presented to the user, in what order they should be presented, etc. In some implementations, the plurality of candidate responsive voice recordings may be ranked based on respective "measures of credibility" associated with the candidate voice recordings themselves and/or with speakers that created and/or recorded the candidate responsive voice recordings. Based on this ranking, one or more of the plurality of candidate responsive voice recordings may be presented to the user. For example, the highest-ranked candidate responsive voice recording may be played back to the user automatically, or in response to a determination that its corresponding measure of credibility is sufficiently greater than those associated with other candidate responsive voice recordings. In some implementations, measures of credibility may be used to search for voice recordings, in addition to or instead of ranking or filtering candidate responsive voice recordings.

Measures of credibility can be objective (i.e., the same across different users), subjective to a particular user (e.g., determined based on attribute(s) of the user or the user's query), or any combination thereof. Objective measures of credibility may be determined based on various attributes of the voice recording and/or speaker, such as based on popularity of the speaker, a title associated with the speaker, an entity (e.g., a newspaper or other publication) of which the speaker is a member, consistency of the speaker's comments, semantic consistency of content of the voice recording with other related content (e.g., other voice recordings or textual content) known to be credible, etc.

Consistency of a speaker's comments may be determined, for instance, by grouping semantic embeddings generated from the speaker's voice recordings into clusters of other similar statements, and determining whether the clusters are semantically consistent or contradictory. For example, a speaker's endorsement of a particular viewpoint may be grouped into a first cluster. The speaker's subsequent contradiction of that viewpoint (which may be difficult to detect syntactically but possible to detect semantically) may be clustered into another cluster that is known to run contrary to the first cluster. The fact that the speaker has semantic embeddings in both contradictory clusters may reduce the speaker's overall measure of credibility.

In some implementations, objective measures of credibility may be determined based on traditional search results that are responsive to a query seeking voice recording(s). Suppose a user uses their voice to submit a query such as "What are the experts saying about the latest poll numbers?" to a voice-based assistant device. The traditional search results returned by that query, which normally might be presented as a ranked list on a display, may not be directly useful to this particular user, e.g., because the assistant device lacks a display or because the user does not wish to view a display as part of the interaction. However, these results can establish a nexus to one or more voice recordings that might be objectively credible.

Suppose the top-ranked traditional search result links to a text-based article (content) from an authoritative news agency. This may establish, for this particular user's query at least, the news agency as the most credible authority (as the source of the content). Accordingly, voice recordings created by speakers associated with that authority may be promoted over, for instance, voice recordings from other news agencies or entities. This association may be, for example, that the speaker owns, promotes, speaks for, or is employed by an entity that is the source of the content (e.g., a publisher), that the speaker owns, promotes, speaks for, or is employed by an entity closely aligned with an entity that is the source of the content (e.g., an affiliate of a publisher), and so on. In addition, the association may instead be directly between the speaker and the content itself, for example where the speaker is a recognized expert in the subject matter of the query, has a documented history of developing the content or is a recognized thought leader with respect to the content, etc. If no (sufficiently) responsive voice recording is available from the top-ranked news agency, in some implementations, the next traditional search result that is associated with a second news agency may be selected, and a voice recording from a speaker of that second news agency may be sought and returned.

Subjective measures of credibility can be determined based on, for instance, attribute(s) of the user and/or the query they submit. For example, the user may have a user profile that indicates various preferences or interests of the user, content consumption patterns of the user (e.g., do they consume more content about science or sports, art or entertainment?), and so forth. And the user's query itself may reveal attribute(s) of the user and/or speakers they deem credible. For example, a user may explicitly ask, "what does <hypothetical talking head> think about the <recent event>?"

In some implementations, a method may be implemented using one or more processors, and may include: receiving a query provided by a user at an input component of a computing device; searching a corpus of voice recordings based on the query; identifying, from the searching, a plurality of candidate responsive voice recordings; ranking the plurality of candidate responsive voice recordings based on measures of credibility associated with speakers that created the candidate responsive voice recordings; and based on the ranking, providing, for presentation to the user at an output component of the same computing device or a different computing device, one or more of the plurality of candidate responsive voice recordings.

In various implementations, the measures of credibility associated with the speakers may be determined based on one or more attributes of the user or the query. In various implementations, the measures of credibility associated with the speakers may be determined based at least in part on one or more preferences or affiliations of the user. In various implementations, the measures of credibility associated with the speakers may be determined based at least in part on content of the query from the user. In various implementations, the query from the user may specify a category of speaker or an identity of a speaker, and the measures of credibility associated with the speakers are determined based at least in part on the category or identity of the speaker.

In various implementations, the searching may include searching transcriptions of the voice recordings stored in association with the voice recordings. In various implementations, the searching may further include searching questions stored in association with, and answered by, the voice recordings. In various implementations, searching questions may include determining distances between an embedding generated from the query from the user and one or more embeddings generated from one or more questions that are answered by one or more voice recordings of the corpus.

In another related aspects, a method implemented using one or more processors may include: receiving a query provided by a user at an input component of a computing device; searching a corpus of documents based on the query; identifying, from the searching, a top-ranked document that is responsive to the query; searching a corpus of voice recordings for responsive voice recordings that were created or distributed by an entity that created or distributed the top-ranked document; and providing, for presentation to the user at an output component of the same computing device or a different computing device, one or more of the responsive voice recordings. In various implementations, the entity may be an author of the top-ranked document and/or an organization that distributed the top-ranked article.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
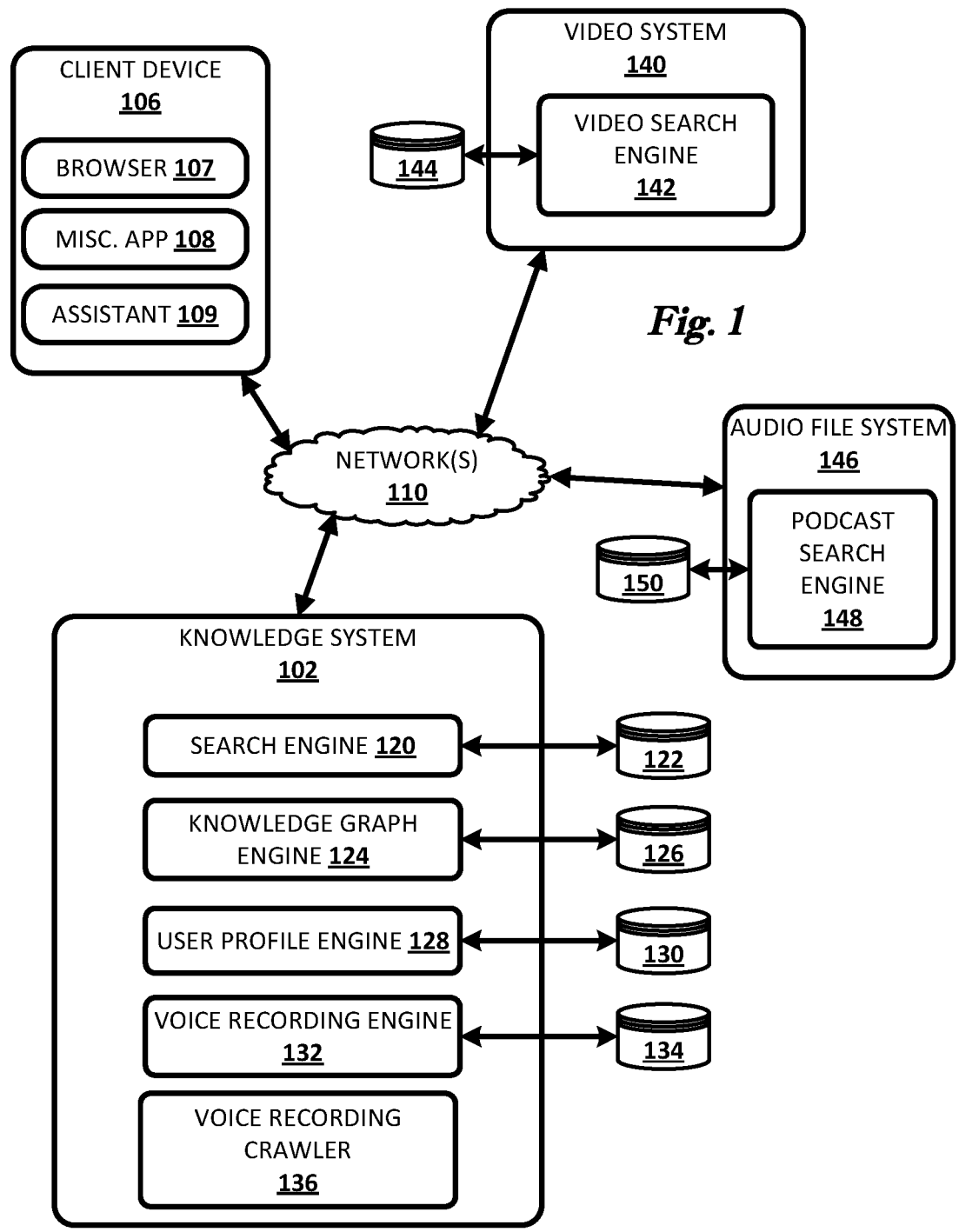
FIG. 1 illustrates an environment in which various aspects of the present disclosure may be implemented, in accordance with various implementations.

FIG. 1 illustrates an environment in which selected aspects of the present disclosure may be implemented. The example environment includes one or more client devices 106 and a knowledge system 102. Knowledge system 102 may be implemented in one or more computers (sometimes referred to as the "cloud") that communicate, for example, through a network. Knowledge system 102 is an example of an information retrieval system in which the systems, components, and techniques described herein may be implemented and/or with which systems, components, and techniques described herein may interface.

One or more users may interact with knowledge system 102 via one or more client devices 106. Each client device 106 may be a computer coupled to the knowledge system 102 through one or more networks 110 such as a local area network (LAN) or wide area network (WAN) such as the Internet. Each client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device), and so forth. Additional and/or alternative client devices may be provided.

For example, some client devices referred to herein as "assistant devices" may be designed primarily to allow users to interact with a software process referred to herein as an "automated assistant" (also referred to as a "virtual assistant," "voice assistant," "chatbots," etc.) using free-form natural language input. As used herein, free-form input is input that is formulated by a user and that is not constrained to a group of options presented for selection by the user.

Assistant devices may take various forms, such as standalone interactive speakers, standalone interactive speakers with touchscreen displays, etc. Other client devices 106 aside from assistant devices may also enable interaction with the automated assistant.

Each client device 106 and knowledge system 102 may include one or more memories for storage of data and software applications, one or more processors for accessing data and executing applications, and other components that facilitate communication over a network. The operations performed by one or more client devices 106 and/or knowledge system 102 may be distributed across multiple computer systems. Knowledge system 102 may be implemented as, for example, computer programs running on one or more computers in one or more locations that are coupled to each other through a network.

Each client device 106 may operate a variety of different applications. In FIG. 1, client device 106 includes a web browser 107, a miscellaneous application 108, and an "assistant" application 109 that enables a user to engage with the aforementioned automated assistant using free-form natural language input. Miscellaneous application 108 may take various forms, including but not limited to an email client, a file transfer client (e.g., FTP, cloud drives, etc.), a proprietary application, a video playback application, a social networking application, and so forth.

While depicted as part of client device 106, assistant application 109 may be implemented to various degrees on both client device 106 and knowledge system 102. Assistant application 109 may provide an interface to engage with an automated assistant (not depicted). The automated assistant may syntactically and/or semantically process free-form natural language input, such as queries, commands, etc., to determine the user's intent and/or any parameters for fulfilling that intent. The automated assistant may then attempt to fulfill that intent, e.g., by searching for information responsive to the input (e.g., dictionary definitions and/or dictionary usage examples), performing an action responsive to the input (e.g., playing music, turning on a networked appliance), and so forth. In some implementations, the automated assistant may include (on client device 106 and/or on knowledge system 102) various components not depicted in FIG. 1, such as a natural language processor, an entity tagger, a speech-to-text ("STT") component (also referred to as an "automatic speech recognition" or "ASR" component), a text-to-speech ("TTS") component to generate computerized speech output from the automated assistant, and so forth.

In various implementations, knowledge system 102 may include a search engine 120, a knowledge graph engine 124, a user profile engine 128, a voice recording engine 132, and a voice recording crawler 136. One or more of components 120, 124, 128, 132, and/or 136 may be combined with each other, omitted, or implemented outside of knowledge system 102. Moreover, one or more of components 120, 124, 128, 132, and/or 136 may be implemented using any combination of software and hardware, and may be implemented on a single computer or across multiple computers, similar to knowledge system 102 itself.

Search engine 120 may maintain an index 122 for use by knowledge system 102. Search engine 120 may process documents and updates index entries in the index 122, for example, using conventional and/or other indexing techniques. For example, search engine 120 may crawl one or more resources such as the World Wide Web and index documents accessed via such crawling. As another example, search engine 120 may receive information related to one or more documents from one or more resources such as web masters controlling such documents and index the documents based on such information. A document is any data that is associated with a document address. Documents include web pages, word processing documents, portable document format (PDF) documents, images, emails, calendar entries, videos, and web feeds, to name just a few. Each document may include content such as, for example: text, images, videos, sounds, embedded information (e.g., meta information and/or hyperlinks); and/or embedded instructions (e.g., ECMAScript implementations such as JavaScript).

In various implementations, knowledge graph engine 124 may maintain an index 126 that stores a knowledge graph that includes nodes that represent various entities and weighted edges that represent relationships between those entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

Such a knowledge graph may be built, for instance, by crawling a plurality of databases, online encyclopedias, and so forth, to accumulate nodes presenting entities and edges representing relationships between those entities. In some implementations, the knowledge graph may be populated with information about similarities and/or differences between entities in documents. The various data and relationships stored in the knowledge graph may be used by various components of knowledge system 102, such as search engine 120, to search for documents, voice recordings, etc.

Of particular relevance to implementations described herein, some of the nodes maintained by knowledge graph engine 124 may represent well-known and/or authoritative individuals such as celebrities, scientists, economists, politicians, journalists, professors, famous fictional characters in film, television shows, or podcasts, or other similar individuals, that may have created, or may have been associated with the creation of, voice recordings as used herein. The knowledge graph may also include relationships between these individuals, entities (e.g., companies, universities, news organizations), and/or various attributes such as areas of expertise, popularity (e.g., gauged by followers on social media or other means), experience (e.g., positions held), education, accomplishments, etc.

User profile engine 128 may be configured to track, store in database 130, and/or maintain information about users, e.g., as user "accounts" and/or "profiles" (these terms will be used herein interchangeably). In some cases, a user may operate a coordinated ecosystem of client devices 106 that are tied together with the user's account/profile (which may be accessible using various types of credentials). Additionally or alternatively, one or more software applications, such as browser 107 and/or assistant 109, may be tied to a particular user's account/profile. For example, if a user signs into their account with browser 107, the user's search history, queries, etc., may be accessible to user profile engine 128. Database 130 may include a plurality of user profiles associated with a plurality of users. Each user profile may store one or more attributes of a respective user. Users may have the ability to opt in and/or out of having any attributes or other pieces of user data stored in database 130.

The user attributes that may, with a user's express permission, be stored in database 130 may include, but are not limited to, preferences (explicitly provided by the user and/or inferred based on user interaction with various software), places visited, search history, purchase history, address, profession, demographic data, frequently-consumed electronic content sources, personal smart device inventory (e.g., smart appliances such as lights, garage door opener, door locks), browsing habits, and so forth. This information may be used, e.g., by user profile engine 128 and/or by other components of knowledge system 102, to identify and/or rank responsive voice recordings for playback.

Voice recording engine 132 may be configured perform selected aspects of the present disclosure to collect and/or make voice recordings searchable and/or available in response to user queries. For example, voice recording engine 132 may be configured to store, in voice recording index 134, a plurality of voice recordings that are selected/generated from various sources, such as user-submitted answers to crowdsourced questions, electronic audio and/or audio/visual files distributed by various sources, and so forth. Voice recording engine 132 may also be configured to rank candidate voice recordings that are returned in response to a user's query, e.g., to select the order in which the voice recordings will be presented (e.g., linked on screen, played back) to the user and/or to select which of a plurality of candidate voice recordings will be presented at all.

Voice recording crawler 136 may be configured to crawl various online repositories of electronic audio and/or video files to identify, obtain, extract, excise, and/or generate voice recordings (sometimes referred to as "snippets" or "clips") that are potentially responsive to users' queries. These voice recordings may then be provided to voice recording engine 132, which may store them in video clip index as described previously. In some implementations, voice recording crawler may leverage the knowledge graph hosted by knowledge graph engine 124 in order to mine audio and/or video files for voice recordings. For example, if a particular speaker is highly popular, then related speakers, an organization with which the popular speaker is associated, and/or content related to the popular speaker may be identified from the knowledge graph and used to identify audio and/or video files from which voice recordings can/should be preemptively extracted.

As used herein, an "electronic audio file" may refer to any digital file that stores audio data of a person's voice. Electronic audio files may have various lossy or lossless audio coding formats (or audio compression format), including but not limited to MPEG-1/2 Audio Layer III ("MP3"), Advanced Audio Coding ("AAC"), Vorbis (or Ogg), Windows Audio Media ("WMA"), Free Lossless Audio Code ("FLAC"), Opus, Waveform Audio File ("WAV"), and so forth.

As used herein, an "electronic video file" may refer to any digital file that stores synchronized visual and audio data. Electronic video files may have various formats, including but not limited to Audio Video Interleave ("AVI"), Flash Video Format ("FLV"), matroska ("MKV"), QuickTime® Movie Format ("MOV"), various versions of Moving Picture Experts Group ("MPEG") such as MPEG-1, MPEG-2, MPEG-3, MPEG-4 (or "MP4"), Windows Media Video ("WMV"), HTML5, WEBM, and so forth.

In some implementations, voice recording crawler 136 may be configured to interface with, and obtain/extract voice recordings from, one or more online sources, such as a video system 140 and/or an audio file system 146. Video system 140 may be configured to store, maintain, distribute (e.g., stream), and/or index electronic video files stored in a video file database (or "corpus") 144. In many cases, video system 140 may include a video search engine 142 that is configured to receive a search query, e.g., from browser 107, miscellaneous application(s) 108, and/or automated assistant 109, and search index 144 for responsive video files. In some implementations, video search engine 142 may provide the responsive video files for streaming playback, e.g., in browser 107 or in another application.

Audio file system 148 may take various forms, such as a system that hosts/stores podcasts, radio shows, music, or other audio recordings. Audio file system 146 may store, maintain, distribute (e.g., stream), and/or index electronic audio files stored in an audio file database (or "corpus") 150. In many cases, audio file system 146 may include an audio file search engine 148 that is configured to receive a search query, e.g., from browser 107, miscellaneous application(s) 108, and/or automated assistant 109, and search index 150 for responsive audio files (e.g., podcasts). In some implementations, audio file search engine 148 may provide the responsive video files for streaming playback, e.g., in browser 107 or in another application.

Voice recording crawler 136 may be configured to perform selected aspects of the present disclosure to identify, generate, excise/extract, and/or obtain voice recordings containing utterances of sought-after information from electronic audio and/or video files stored in repositories such as video file index 144 and/or audio file index 150. Voice recording crawler 136 may perform these operations offline (e.g., during downtimes or times of low network traffic, middle of the night, etc.), in batches, and/or on-demand (e.g., in response to a user query). As used herein, an "audio recording," "audio segment," "voice recording," or "audio clip" may be include an entire electronic audio/video file or a portion of the electronic file. For example, an audio clip that contains an utterance of information that is likely to be responsive to future user queries may be excised or extracted from a longer electronic file that contains other extraneous content that isn't as relevant. The voice recordings provided by voice recording crawler 136 may be stored in voice recording index 134 along with, for instance, transcriptions of the audio recording. This information may be accessible, e.g., by way of voice recording engine 132, as a searchable database, or by any other means.

In various implementations, voice recording crawler 136 may also obtain, from electronic files it crawls (e.g., at systems 140, 146), textual data associated with electronic files, e.g., as metadata. These textual data may convey spoken dialog and other sound(s) contained in electronic video files. In the case of video files, these textual data are often used to present subtitles and/or captions on a screen while the video file is being played. Subtitles may include spoken dialog, whereas captions may include both dialog and also may include other sounds contained in video files, such as music, sound effects, etc. In many implementations, voice recording crawler 136 may store these textual data in association with the voice recordings stored in voice recording index 134. Consequently, the voice recordings stored in index 134 may be searchable using these textual data.

Voice recording engine 132 may also store crowdsourced voice recordings that are created specifically for use as responsive answers to various questions. In some implementations, a population of users may be solicited to submit voice recordings that are responsive to various questions.

These questions may be posed by other users, or may be crowdsourced by entities such as search engine companies, organizations, businesses, etc. In some implementations, users may scroll through lists of questions for which voice-recorded answers are solicited, and may select an individual question in order to create a voice recording that (ostensibly) is responsive to the question. Measures of credibility for these user-submitted voice recordings and/or their creators may be determined in order to ensure that the best voice recordings are provided to users at large.

Transcriptions of voice recordings stored in database 134 may be created in various ways. As noted previously, audio and/or video files made available by systems 140, 146 may be stored in association with metadata that includes, for instance, subtitles/closed captions that can also be extracted. For voice recordings without preexisting subtitles/captions, a human-generated transcript may be created. Additionally or alternatively, in some implementations, techniques such as speech-to-text ("STT") processing (also referred to as "voice recognition processing") may be used to create a computer-generated transcript of a voice recording.

In this specification, the term "database" and "index" will be used broadly to refer to any collection of data. The data of the database and/or the index does not need to be structured in any particular way and it can be stored on storage devices in one or more geographic locations. Thus, for example, the indices 122, 126, 130, 134, 144, and/or 150 may include multiple collections of data, each of which may be organized and accessed differently.

In various implementations, search engine 120, voice recording engine 132, or some combination thereof, may be configured to search for, rank, and provide information indicative of voice recordings that are responsive to user queries. In some such implementations, responsive voice recordings may be returned to the user as actionable elements, e.g., as part of a list of hyperlinks akin to a traditional search results page, as a swipe-able banner of audio files and/or video clips that the user may select from, etc. In some implementations, especially where the requesting user is voice-operating an assistant device (and particularly where it lacks a display), the most relevant and/or highly ranked voice recording(s) may be played back automatically.

In some implementations, content of a user's query may be used to identify and/or rank voice recordings. For example, a user may request an answer or explanation from a particular speaker ("What did Buzz Aldrin say about moon dust?"), or from someone affiliated with a particular organization ("What was NASA's biggest challenge in getting humans on the moon?"). In some implementations, subjective attribute(s) of the requesting user, e.g., obtained from their user profile stored in database 130, may be used to identify and/or rank voice recordings. For example, it may be assumed that residents of a particular city will prefer to hear what local newscasters are saying about a national event over newscasters from other cities. Similar, a user's profile may reveal that the user frequents a particular film critic's website. When that user requests critical commentary about a film (without necessarily identifying their favorite critic in the query), any voice recordings featuring that favorite critic or other similar critics (e.g., who tend to have similar opinions) may be promoted over other, less familiar critics.

In some implementations, attributes of speakers that created voice recordings may be used to identify and/or rank voice recordings. As one example, a fan of one sports franchise may consider a person associated with a rival franchise to be less credible—and hence their commentary may be less credible—than someone associated with the user's favorite franchise. Additional examples of this will be described below. In some implementations, various components of knowledge system 102 such as voice recording engine 132 may determine (e.g., calculate) measures of credibility associated with speakers that created voice recordings. As noted previously, measures of credibility can be object across users, subject to individual users, or any combination thereof. Both subjective and objective signals can be used to determine a measure of credibility of a particular speaker vis-à-vis a particular user.

In some implementations, measures of credibility for crowdsourced voice-recorded answers may be determined based on various aspects of the speakers that provided them and/or the recordings themselves. In some implementations, measures of credibility of crowdsourced voice-recorded answers created by a particular speaker may be determined based on popularity and/or other metrics associated with those recordings. For example, if crowdsource voice-recorded answers contributed by a particular speaker tend to be popular among people seeking information (e.g., determined by click through rates, playback rates, etc.), then that particular speaker and/or the recordings they create may be assigned relatively strong measures of credibility.

In some implementations, crowdsourced voice-recorded answers may be ranked based on accuracy and/or consistency of their content compared to other crowdsourced voice-recorded answers. For example, a plurality of voice recordings (and/or their associated transcripts) that are submitted in response to a particular crowdsourced question may be processed—e.g., using a machine learning model such as various types of neural networks, a support vector machine, etc.—to generate a plurality of semantically-rich embeddings. These embeddings may coalesce into clusters of semantically-similar voice-recorded answers, e.g., based on Euclidian distance, cosine similarity, dot product, etc. Clusters of semantically-similar voice recordings that are subsequently approved (e.g., consumed, liked, etc.) by users at large may be deemed more credible than other clusters that are less popular. Another potential signal of a cluster's credibility is its size. For many crowd-sourced questions, the highest quality (e.g., most correct, most articulate, minimal or unobtrusive background noise, etc.) voice-recorded answers may tend to coalesce into relatively large clusters. Outlier voice-recorded answers, on the other hand, may not tend to cluster with other voice-recorded answers, e.g., because they are incorrect or otherwise of low quality (e.g., noisy, non-articulate speakers, heavy accents, etc.).

In the examples described above, embeddings are generated for voice-recorded answers submitted in response to crowdsourced questions. However, this is not meant to be limiting. In some implementations, embeddings may be generated for other voice recordings that are extracted from videos (e.g., from index 144) or audio files (e.g., from index 150). In yet other implementations, embeddings may be generated for both crowdsourced voice-recorded answers and other voice recordings that are extracted from videos (e.g., from index 144) or audio files (e.g., from index 150).

Clusters of semantically-similar embeddings may be used for purposes other than assigning measures of credibility and/or ranking voice recordings. For example, a cluster may represent a collective viewpoint on a topic from a plurality of speakers. Multiple clusters, therefore, may represent multiple collective viewpoints on the topic from multiple different groups of speakers. For example, commentators (e.g., sports casters, fans, etc.) associated with two rival sports franchises may have competing perspectives on the result of a game between the franchises. These perspectives may tend to coalesce into two different clusters. This clustering may be leveraged to enable users to seek particular perspectives, or even multiple perspectives. For example, a fan of one team could ask, "What is the other side saying about the game?" to hear one or more voice recordings that were part of a cluster of voice recordings that represent perspectives from the other team. Similarly, a user could ask for perspectives from both sides to receive balanced results.

In some embodiments, knowledge system 102, e.g., by way of search engine 120, may determine whether to return voice recordings at all, as opposed to returning TTS-generated audio. Suppose a user's query returns voice recordings that are only tangentially and/or tenuously related to answering the user's question, and/or that were only recorded by speakers with relatively low measures of credibility. Suppose search engine 120 is also able to identify textual search results that are far more relevant and/or credible. In some such implementations, knowledge system 102 may perform TTS processing on the top-ranked textual result(s) to generate audio content, and may present that TTS-generated audio content to the user in lieu of the less relevant/credible voice recordings.

Figure 2A:
FIGS. 2A and 2B depict examples of how different voice recordings may be presented to different users, in accordance with various implementations.
Figure 2B:

FIGS. 2A-B depict examples of interactions between users 101A and 101B, respectively, and an automated assistant (not depicted) implemented at least in part on a client device 206. In FIGS. 2A-B, client device 206 takes the form of an assistant device with a speaker and a microphone, and no display. However, this is not meant to be limiting, and in other examples the client device may include a display. Users 101A-B may interact with the automated assistant by speaking commands/queries to client device 206.

In FIG. 2A, a first user 101A invokes the automated assistant by speaking a "wake word," "Hey Assistant." This may cause the automated assistant to begin "listening" to whatever first user 101 says next, e.g., by beginning to perform STT processing on utterances captured by the microphone of client device 206. In other implementations, other mechanisms besides wake word(s) may be used to invoke the automated assistant. User 101 then asks, "How do you hard boil an egg?" The automated assistant audibly responds, "Here's what <famous restaurant chef> says." Then, the automated assistant begins playback of a voice recording of that famous chef, saying, "The best way to create easy-to-peel hard-boiled eggs on the stove is to . . . ."

The particular recording of FIG. 2A may have been selected, e.g., by search engine 120 and/or voice recording engine 132, based on a variety of signals. For example, that particular chef's voice recording may be the most objectively popular voice recording amongst all viewers seeking instructions to hard boil eggs. Or, in some implementations, the chef's voice recording may have been returned because a top-ranked document of traditional search results (e.g., ranked list of hyperlinks to documents) provided by search engine 120 is from an organization such as a company or restaurant that employs and/is owned by the chef. In other words, user 101A might not see these traditional search results, but the voice recording s/he hears may be selected based on these traditional search results.

Additionally or alternatively, that particular chef may be identified, e.g., by voice recording engine 132 and/or user profile engine 128, as a subjective favorite of first user 101A, e.g., based on his or her search history, television watching habits, "likes" on social media, correspondence (e.g., emails, text messages, direct messages) with other users, and so forth. For example, user 101A may have frequented (and/or highly rated) a restaurant at which the chef cooks. Based on those past visits, that chef's responsive voice recording may be promoted over voice recordings of other chefs for which user 101A has less familiarity.

In FIG. 2B, a different user 101B asks the exact same question as was asked in FIG. 2A. In FIG. 2B, however, knowledge system 102 has information about user 101B that it lacked about user 101A in FIG. 2A. For example, user 101B may have demonstrated an interest or preference in cooking with a pressure cooker, e.g., via their browser history, search history, explicitly-set preferences, recent purchases (e.g., purchasing pressure cooker cookbooks, purchasing pressure cooker, purchasing pressure cooker accessories), etc. Consequently, a different voice recording is returned than what was returned in FIG. 2A. In particular, the automated assistant now returns a voice recording from a pressure cooker blogger, which says, "The <quick pressure cooker> creates the easiest-to-peel hard-boiled eggs you've ever seen. Here's how you do it . . . " In this example, the blogger's voice recording may have been selected in part based on the preference of user 101B for pressure cooking, but also based on objective signals (e.g., promoting that particular pressure cooker blogger over less popular pressure cooker bloggers).

Figure 3A:
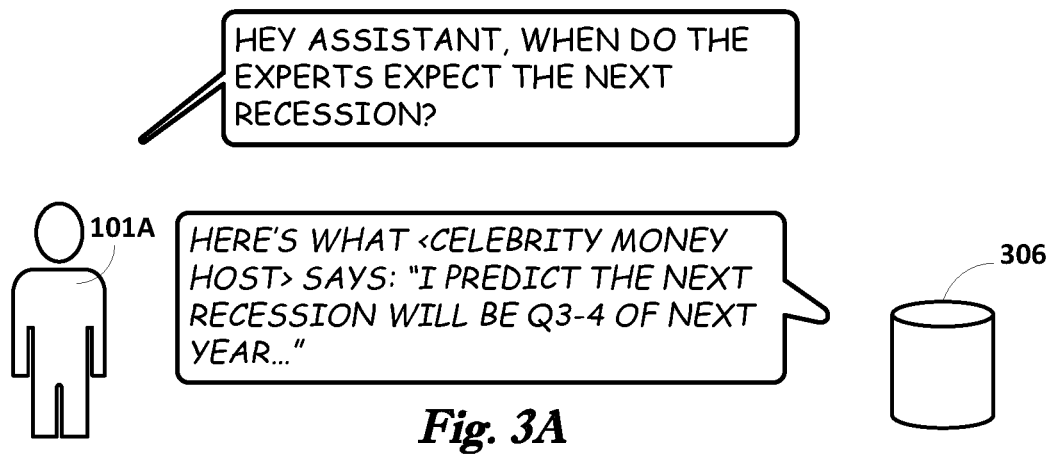
FIGS. 3A, 3B, and 3C depict more examples of how different voice recordings may be presented to different users and/or in response to different queries, in accordance with various implementations.
Figure 3B:
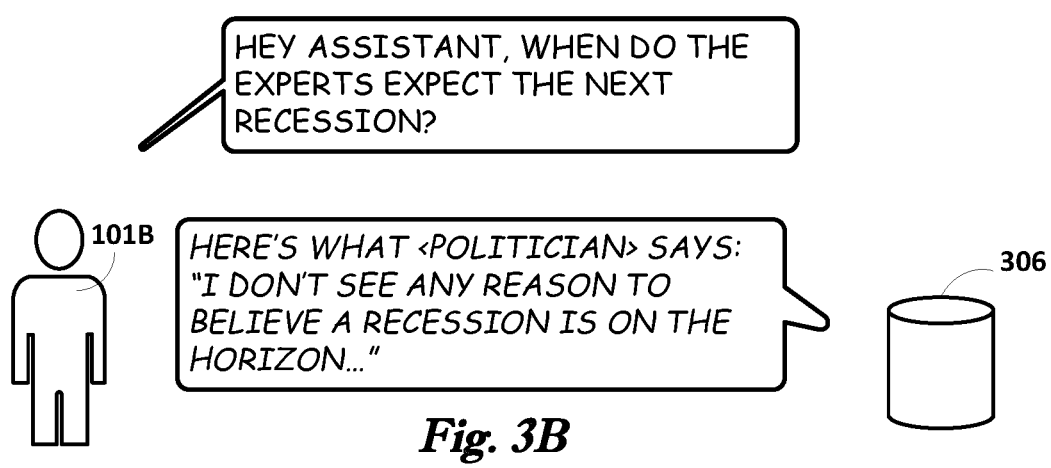
Figure 3C:
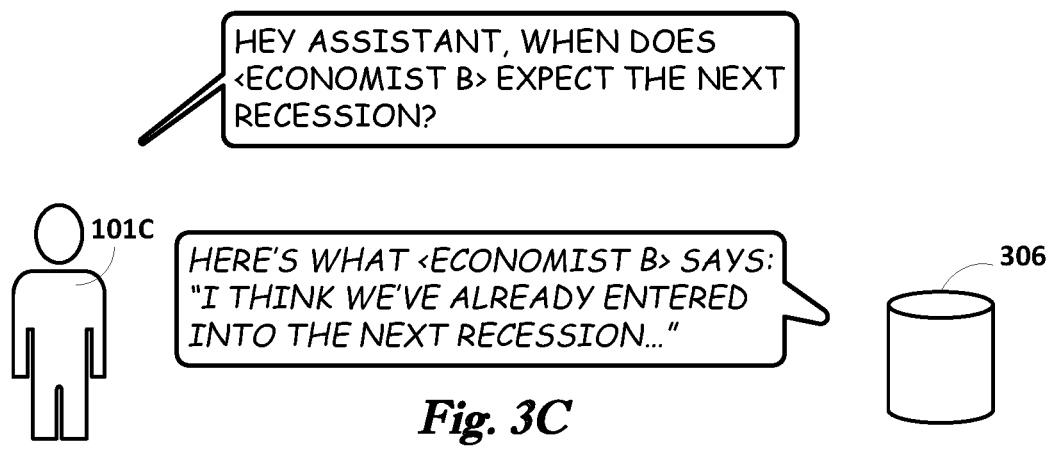

FIGS. 3A-C demonstrate more examples of techniques described herein being used to search for and return voice recordings that are responsive to user's queries. Users 101A-C once again interact with an automated assistant (not depicted) that operates at least in part on a client device 306 taking the form of an interactive speaker.

In FIG. 3A, the user 101A asks, "When do the experts expect the next recession?" The automated assistant and/or knowledge system 102 searches for, and returns, the voice recording that is most relevant, pertinent, and/or credible to that particular user 101A. In this example, user 101A prefers receiving information from a particular celebrity money host (or from a channel or news feed at which the particular money host works), which may be determined based on his or her explicitly-defined preferences, television watching habits, Internet browsing habits, etc. Consequently, user 101A is played back an audio recording from the celebrity money host in which the host utters the phrase, "I predict the next recession will be Q3-4 of next year . . . ."

In FIG. 3B, a different user 101B asks the automated assistant the exact same question. However, user 101B in FIG. 3B has been determined to have different tastes than user 101A of FIG. 3A. For example, user 101B may consider information from politicians to be the most credible and/or useful, e.g., as evidenced by their frequently visiting political websites, watching legislative sessions on television, etc. Consequently, user 101B receives a voice recording from a politician in which the politician says, "I don't see any reason to believe a recession is on the horizon."

In some implementations, content of the query itself may be used to evaluate measures of credibility associated with candidate responsive voice recordings. An example of this is depicted in FIG. 3C, in which another user 101C asks the automated assistant the question, "When does <economist B> expect the next recession. Here, user 101C has identified a specific source (speaker) from which the user would like to hear responsive content. In some implementations, when a user identifies a desired speaker in the query, that may be a strong signal that voice recordings of that requested speaker should be heavily favored over all others. Similarly, when a user identifies a desired category of speaker (e.g., expert in particular science, journalist from particular organization, particular type of legal expert or government official), that may be a strong signal that voice recordings of speakers that match that category should be heavily favored over others.

In some cases, if no responsive recordings are available from the requested speaker, the user may not receive any voice recording results at all, and instead may receive either the most relevant textual results (akin to a traditional search) or an error message (especially when engaging with a voice-based assistant device). In FIG. 3C, the automated assistant provides a voice recording from the requested speaker that is directly responsive to the user's query. In particular, in the voice recording, the requested economist says, "I think we've already entered into the next recession."

However, suppose there are not directly relevant voice recordings from the requested economist. Perhaps that economist has only commented direction on his or her prediction of the next recession via textual articles, newspaper quotes, social media updates, or other text-only means. Suppose further that the requested economist can be heard in other voice recordings, but his or her spoken comments are simply not as relevant as the aforementioned textual results. In some implementations, the relevance of what is said in voice recordings may be weighed against and/or as part of calculating the measure of credibility associated with a particular voice recording. More generally, a measure of credibility need not be associated exclusively with the speaker, but can also be associated more generally with a voice recording. Thus, for instance, an off-topic recording from the economist may not be credible to user 101C, even though user 101C may generally consider the economist highly credible.

Figure 4:
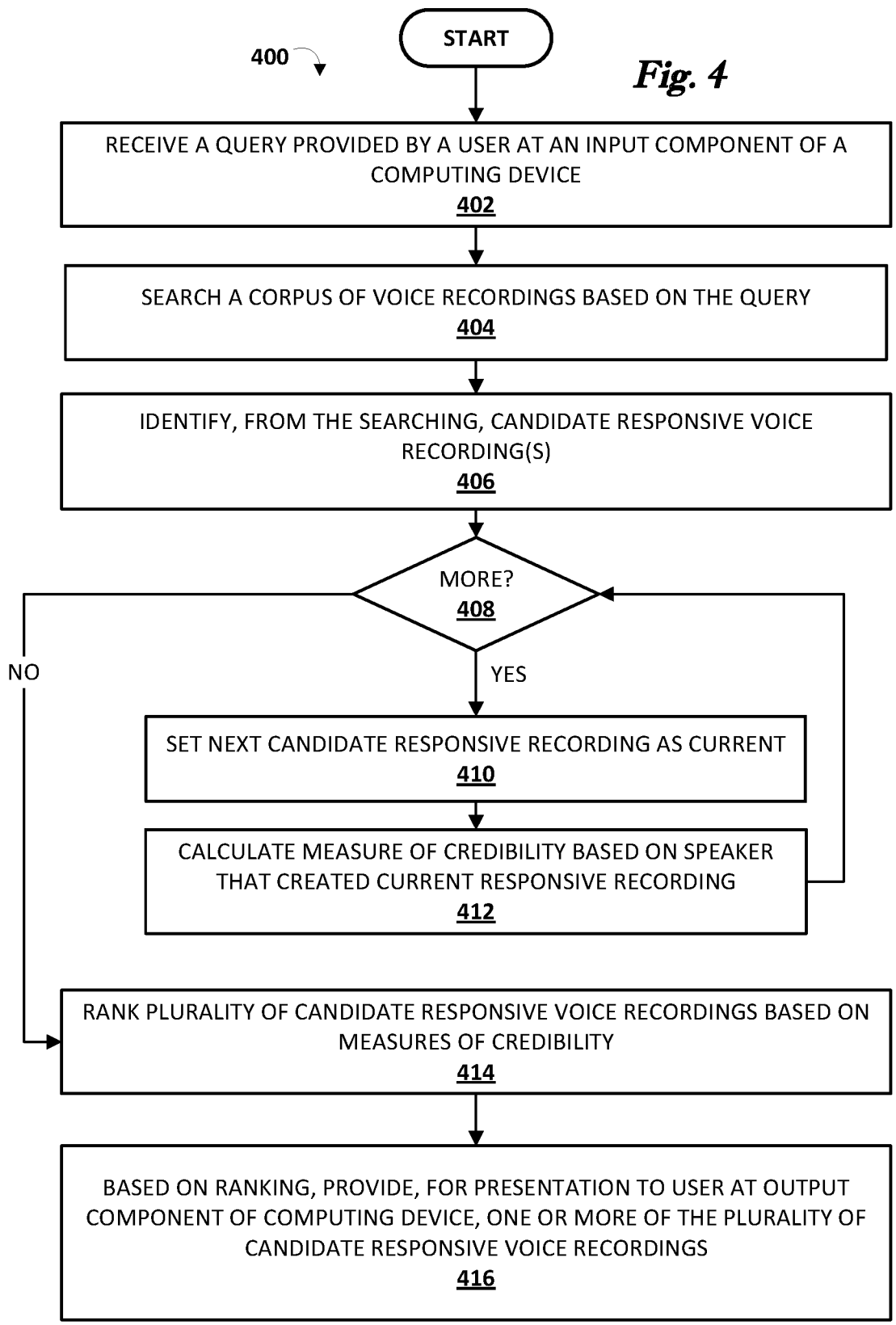
FIG. 4 depicts a flow chart illustrating an example method in accordance with various implementations.

Referring now to FIG. 4, one example method 400 for practicing various aspects of the present disclosure is described. For convenience, the operations of the flow chart are described with reference to a system that performs the operations. This system may include various components of various computer systems, including various classifiers, engines, and/or client applications described herein. Moreover, while operations of method 400 are shown in a particular order, this is not meant to be limiting. One or more operations may be reordered, omitted or added.

At block 402, the system may receive a query provided by a user at an input component of a computing device. In many implementations, the query will be a voice query uttered by the user, and the input component will be a microphone of a computing device such as an assistant device. However, this is not meant to be limiting. User queries may be received via other input modalities, such as via text typed by a user at a physical or virtual keyboard. For example, a user could type a question such as "What did Neil Armstrong think about going to the moon?" into a search engine search field.

At block 404, the system, e.g., by way of search engine 120 and/or voice recording engine 132, may search a corpus of voice recordings based on the query received at block 402. For example, submission of the query may cause search engine 120 or other component(s) of knowledge system 102 to seek voice recordings that are responsive to the query, in addition to or instead of traditional search results. In some implementations, a user may preemptively filter out non-voice recordings, e.g., using a toggle graphical element of web browser 107 or by including a command in the query such as "voice results only" or "voice only."

In some implementations, the searching of block 404 may include searching questions stored in association with, and answered by, the voice recordings. For example, a user's query may be compared to crowdsourced questions, in addition to or instead of to the answers thereto. In some implementations, this technique may be applied as a filtering mechanism to narrow the search space of potentially responsive voice recordings. Additionally or alternatively, in some implementations, comparing the user's query to crowd-sourced questions (or interview questions where a voice recording is extracted from a preexisting audio/video file) may include determining distances between an embedding generated from the user's query and embedding(s) generated from question(s) that are answered by voice recordings of the corpus.

Referring back to FIG. 4, at block 406, the system may identify, from the searching, one or more candidate responsive voice recordings. These candidate responsive voice recordings may be identified, for instance, based on similarities between token(s) of the query and various data points associated with the voice recordings. In some implementations, the candidate responsive voice recordings may be identified based on accompanying transcripts, which as noted above may be human-generated or computer-generated.

In some implementations, the responsive candidate voice recordings may be identified based on metadata such as tags, topics discussed, taglines, titles, synopses, and so forth. For example, a podcast may include a synopsis that summarizes the content of the podcast. If a voice recording clip or snippet is extracted from the podcast, all or part of this synopsis may be preserved in association with the voice recording clip/snippet, such that the clip/snippet is searchable using this metadata. As another example, a video (and/or audio clips extracted therefrom) that accompanies a news article on a website may be searchable using text of the news article, a synopsis of the news article, names of people associated with the article (e.g., author, reporter, people quoted, etc.), and so forth.

At block 408, the system may determine whether there are any more responsive candidate voice recordings for which measures of credibility have not yet been determined. If the answer is yes, then method 400 may proceed to block 410, at which point a next responsive candidate voice recording is set as the current candidate voice recording.

At block 412, the system may calculate a measure of credibility for the current candidate voice recording and/or the speaker thereof. As described previously, this measure of credibility may be calculated based on a variety of signals that are objective across users and/or subjective to the user who submitted the query at block 402. In some implementations, the measure of credibility may be determined based on one or more attributes of the user or the query. For example, suppose the speaker of the current candidate voice recording is employed at a news organization and the user frequently visits and spends time reading articles on the news organization's website. These facts may yield a relatively strong measure of credibility. By contrast, if the user prefers a rival news organization, the measure of credibility for the current candidate voice recording may be diminished. In some implementations, the measure of credibility may be determined based at least in part on one or more preferences or affiliations of the user. In some implementations, the measure of credibility may be determined based at least in part on content of the query from the user, e.g., the user requests a specific speaker or a recording from someone affiliated with a particular organization.

Method 400 may then proceed back to block 408, at which point the system determines whether there are any more responsive candidate voice recordings. If the answer is yes, blocks 410-412 may repeat. If the answer at block 408 is no, however, then method may proceed to block 414. At block 414, the system may rank the plurality of candidate responsive voice recordings based on the measures of credibility associated with the candidate responsive voice recordings and/or the speakers that created them.

Based on the ranking, at block 416, the system may provide, for presentation to the user at an output component of the same computing device or a different computing device, one or more of the plurality of candidate responsive voice recordings. For example, if the computing device has a display, then one or more of the responsive voice recordings may be presented as graphical elements that are selectable to initiate playback of a respective voice recording. Alternatively, and especially if the computing device is audio-only, the n (positive integer) highest ranked voice recording(s) may be played to the user audible, one after the other. In some such implementations, the user can skip ahead to the next voice recording by, for instance, speaking a command (e.g., "next"), making a gesture in front of a camera or other sensor, and so forth.

Figure 5:
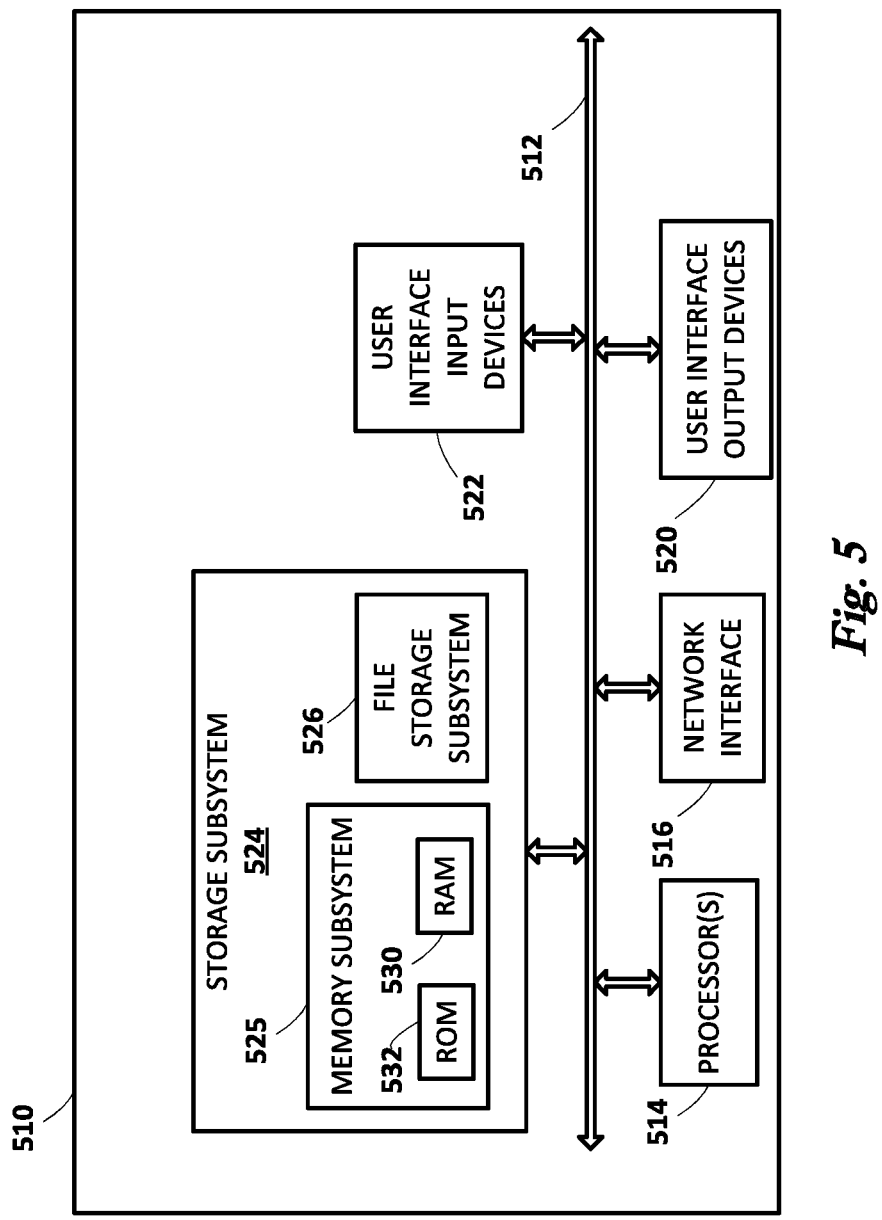
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 526, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides one or more network interfaces to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 526 stores programming and data constructs that provide the functionality of some or all of the modules described herein. For example, the storage subsystem 526 may include the logic to perform selected aspects of method 400, and/or to implement one or more components of knowledge system 102 such as voice recording engine 132 and/or voice recording crawler 136.

These software modules are generally executed by processor 514 alone or in combination with other processors. Memory 525 used in the storage subsystem 526 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 526, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   receiving a query provided by a user at an input component of a computing device;
   searching a corpus of documents based on the query;
   identifying, from the searching, a top-ranked document that contains content that is responsive to the query;
   searching a corpus of voice recordings for responsive voice recordings that were created or distributed by an entity that is associated with the content; and
   providing, for presentation to the user at an output component of the same computing device or a different computing device, one or more of the responsive voice recordings.

2. The method of claim 1, wherein the entity that is associated with the content is the entity which created or distributed the content, and wherein the voice recordings are created or distributed by the entity which created or distributed the content.

3. The method of claim 2, wherein the entity comprises an author of the top-ranked document.

4. The method of claim 2, wherein the entity comprises an organization that distributed the top-ranked article.

5. A system comprising one or more processors and memory storing instructions that, in response to execution by the one or more processors, cause the one or more processors to:
   receive a query provided by a user at an input component of a computing device;
   search a corpus of documents based on the query;
   identify, based on the search, a top-ranked document that contains content that is responsive to the query;
   search a corpus of voice recordings for responsive voice recordings that were created or distributed by an entity that is associated with the content; and
   provide, for presentation to the user at an output component of the same computing device or a different computing device, one or more of the responsive voice recordings.

6. The system of claim 5, wherein the entity that is associated with the content is the entity which created or distributed the content, and wherein the voice recordings are created or distributed by the entity which created or distributed the content.

7. The system of claim 6, wherein the entity comprises an author of the top-ranked document.

8. The system of claim 6, wherein the entity comprises an organization that distributed the top-ranked article.

9. At least one non-transitory computer-readable medium comprising instructions that, in response to execution by one or more processors, cause the one or more processors to:
   receive a query provided by a user at an input component of a computing device;
   search a corpus of documents based on the query;
   identify, based on the search, a top-ranked document that contains content that is responsive to the query;
   search a corpus of voice recordings for responsive voice recordings that were created or distributed by an entity that is associated with the content; and
   provide, for presentation to the user at an output component of the same computing device or a different computing device, one or more of the responsive voice recordings.

10. The at least one non-transitory computer-readable medium of claim 9, wherein the entity that is associated with the content is the entity which created or distributed the content, and wherein the voice recordings are created or distributed by the entity which created or distributed the content.

11. The at least one non-transitory computer-readable medium of claim 10, wherein the entity comprises an author of the top-ranked document.

12. The at least one non-transitory computer-readable medium of claim 10, wherein the entity comprises an organization that distributed the top-ranked article.

* * * * *